United States Patent [19]

Sandstrom et al.

[11] Patent Number: 5,504,137
[45] Date of Patent: Apr. 2, 1996

[54] SILICA REINFORCED RUBBER COMPOSITION AND TIRE WITH TREAD THEREOF

[75] Inventors: Paul H. Sandstrom; Lawson G. Wideman, both of Tallmadge, Ohio

[73] Assignee: The Goodyear Tire & Rubber Company, Akron, Ohio

[21] Appl. No.: 402,241

[22] Filed: Mar. 10, 1995

[51] Int. Cl.⁶ ............................................. C08K 3/36
[52] U.S. Cl. ........................... 524/492; 524/99; 524/493; 524/495; 524/496; 523/215
[58] Field of Search ................... 523/215; 524/482, 524/493, 99, 495, 496

Primary Examiner—Edward J. Cain
Attorney, Agent, or Firm—Henry C. Young, Jr.

[57] ABSTRACT

The present invention relates to a rubber composition containing silica reinforcement and to pneumatic tires having treads comprised of such rubber composition.

A rubber composition comprises at least one elastomer, silica, carbon black and a silica coupler comprised of nicotinamide.

20 Claims, No Drawings

5,504,137

SILICA REINFORCED RUBBER COMPOSITION AND TIRE WITH TREAD THEREOF

FIELD

This invention relates to rubber compositions which contain silica reinforcement and to tires having treads thereof. In one aspect, the rubber composition is comprised of rubber, particularly sulfur cured rubber, reinforced with a combination of silica, and optionally carbon black, and a nicotinamide coupling agent.

BACKGROUND

For various applications utilizing rubber which requires high strength and abrasion resistance, particularly applications such as tires and various industrial products, sulfur cured rubber is utilized which contains substantial amounts of reinforcing fillers, often in a range of about 35 to about 85 parts by weight per 100 parts rubber. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires. The use of such reinforcing fillers for elastomers, including sulfur curable elastomers, is well known to those skilled in such art.

It is important to appreciate that, conventionally, carbon black is a considerably more effective reinforcing filler for rubber products, and particularly for rubber tire treads than silica if the silica is used without a coupling agent, or silica coupler or silica adhesion agent as it may be sometimes referred to herein.

Such coupling agents may, for example, be premixed, or pre-reacted, with the silica particles or added to the rubber mix during a rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface and the rubber reactive component of the coupling agent combines with the rubber itself. Usually the rubber reactive component of the coupler is temperature sensitive and tends to combine with the rubber during the final and higher temperature sulfur vulcanization stage and thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, and is often a sulfur or mercapto moiety and more usually sulfur.

Numerous coupling agents are taught for use in combining silica and rubber, such as, for example, silane coupling agents containing a polysulfide component, or structure, such as, for example, trialkoxyorganosilane polysulfides containing from 2 to 8 sulfur atoms in a polysulfide bridge such as, for example, bis-(3-triethoxysilylpropyl)tetrasulfide and/or trisulfide.

Various U.S. patents relating to silicas and silica reinforced tire treads include, for example, U.S. Pat. Nos. 3,451,458; 3,664,403; 3,768,537; 3,884,285; 3,938,574; 4,482,663; 4,590,052; 5,089,554 and British 1,424,503.

U.S. Pat. No. 4,513,123 discloses a rubber composition utilizing dithiodipropionic acid with natural rubber, or blends of natural and synthetic rubbers, 30–80 parts carbon black, sulfur and organo-cobalt compound for use as skim stock for brass-plated steel. It relates that the rubber composition can contain other additives such as fillers such as clays, silicas or calcium carbonate, process and extender oils, antioxidants, cure accelerators, cure activators, cure stabilizers and the like.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

A reference to an elastomer's Tg refers to its glass transition temperature, which can conveniently be determined by a differential scanning calorimeter at a heating rate of 10° C. per minute.

SUMMARY AND PRACTICE OF THE INVENTION

In accordance with one aspect of this invention, a rubber composition is provided which comprises (A) 100 parts by weight of at least one diene-based elastomer, (B) about 25 to about 100, optionally about 35 to about 90, phr of filler composed of silica and carbon black, and (C) a silica coupler selected from (i) nicotinamide or (ii) a combination of about 95 to about 25, alternatively about 90 to about 55, weight percent nicotinamide and, correspondingly, about 5 to about 75, alternatively about 10 to about 45, weight percent of at least one of dithiodipropionic acid and bis-(3-trialkoxysilylalkyl) polysulfide containing from 2 to 8 sulfur atoms in the polysulfide bridge such as, for example, at least one of bis-(3-triethoxysilylpropyl)tetrasulfide and bis-(3-triethoxysilylpropyl)trisulfide; wherein the weight ratio of said silica coupler to silica is in a range of about 0.01/1 to about 0.2/1; wherein the weight ratio of silica to carbon black is at least 0.1/1, optionally at least 3/1 and optionally at least 10/1.

In one aspect of the invention, such a rubber composition is provided which is comprised of (A) 100 parts by weight of at least one diene-based elastomer, (B) about 25 to about 90 phr particulate silica, (C) up to about 30 phr carbon black, and (D) a silica coupler which is collectively composed of about 90 to about 55 weight percent nicotinamide, about 5 to about 25 weight percent of at least one of bis-(3-triethoxysilylpropyl)tetrasulfide and bis-(3-triethoxysilylpropyl)trisulfide and about 5 to about 25 weight percent dithiodipropionic acid; wherein the weight ratio of said silica coupler to silica is in a range of about 0.01/1 to about 0.2/1; wherein the weight ratio of silica to carbon black is in a range of about 3/1 to about 30/1; wherein the silica is characterized by having a BET surface area in a range of about 50 to about 300 square meters per gram and a dibutylphthalate (DBP) absorption value in a range of about 150 to about 300.

Thus, in one aspect of the invention, the rubber composition contains a combination of both silica and carbon black as elastomer reinforcing pigments.

The rubber composition may contain a minor amount of silica in its silica/carbon black or it may be quantitatively reinforced with silica where carbon black is present in a minor amount.

In another aspect of the invention, a tire is provided having a tread comprised of the said rubber composition of this invention.

Where it is desired that the rubber composition is primarily reinforced with silica as the reinforcing pigment, it is preferable that the weight ratio of silica to carbon black is at least 3/1, preferably at least 10/1 and, thus, for example, in a range of about 3/1 to about 30/1.

In one aspect of the invention, the silica coupler consists essentially of the nicotinamide.

In another aspect, the silica coupler can be composed of a combination of nicotinamide and dithiodipropionic acid. While it is believed that dithiodipropionic acid may exist in isomer forms, such as the 3,3'- and 2,2'-forms, the 3,3'-dithiodipropionic acid form is preferred.

In a further aspect, the silica coupler can be composed of a combination of the nicotinamide together with bis-(3-triethoxysilylpropyl)tetrasulfide and/or a blend of such tetrasulfide and bis-(3-triethoxysilylpropyl)trisulfide.

In a still further aspect, the silica coupler can be composed of a combination of the nicotinamide, dithiodipropionic acid and bis-(3-triethoxysilylpropyl)tetrasulfide or blend of such tetrasulfide and trisulfide moiety thereof.

The nicotinamide can also be referred to as niacinamide. It can conveniently be described as 3-pyridine carboxamide. In particular, it can be characterized by having the properties of melting point in a range of about 130° C. to about 132° C.; infrared spectrometric amide absorption bond intensity in a range of about 95% to about 100% and pyridine absorption bond intensity in a range of about 95% to about 98%.

The nicotinamide is considered herein to be particularly advantageous for the practice of this invention because it has a very strong associative attraction to silica and high solubility in rubber which is considered to be a benefit to the exceptionally good dispersion of silica into the rubber.

Historically, the more homogeneous the dispersion of rubber compound components into the rubber, the better the resultant cured properties of that rubber. The nicotinamide's strong association to silica and high affinity, or compatibility, with rubber is considered herein to lead to excellent silica dispersion.

In one aspect, such a rubber composition can be provided as being sulfur cured. The sulfur curing is accomplished in a conventional manner, namely by curing under conditions of elevated temperature and pressure for a suitable period of time.

The dithiodipropionic acid may typically be characterized by having melting point in the range from 153°–159° C. Such melting point can conveniently be determined by a differential scanning calorimeter at a heating rate of 10° C./minute.

In the practice of this invention, as hereinbefore pointed out, the rubber composition is comprised of at least one diene-based elastomer, or rubber. Thus, it is considered that the elastomer is a sulfur curable elastomer. Such elastomer, or rubber, may be selected, for example, from at least one of cis 1,4-polyisoprene rubber (natural and/or synthetic, preferably natural rubber), 3,4-polyisoprene rubber, styrene/butadiene copolymer rubbers, styrene/isoprene/butadiene terpolymer rubbers, and cis 1,4-polybutadiene rubber.

In one aspect the rubber is preferably of at least two diene based rubbers. Such diene based rubbers may, for example, be of homopolymers and copolymers of conjugated diene hydrocarbons and copolymers of at least one diene hydrocarbon with a vinyl aromatic compound. Such diene hydrocarbons may be, for example, selected from 1,3-butadiene and isoprene. Such vinyl aromatic compound may be, for example, styrene or alphamethylstyrene. For example, a combination of two or more rubbers is preferred such as at least elastomers selected from cis 1,4-polyisoprene rubber (natural or synthetic, although natural is preferred), 3,4-polyisoprene rubber, isoprene/butadiene rubber, styrene/isoprene/butadiene rubber, emulsion and solution polymerization derived styrene/butadiene rubbers, cis 1,4-polybutadiene rubber, medium vinyl polybutadiene rubber having a vinyl content of from 30 to 50, high vinyl polybutadiene having a vinyl content of from 50 to 75, and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black reinforcing filler(s) to contribute a reasonably high modulus and high resistance to tear. The combined weight of the silica and carbon black, as hereinbefore referenced, may be as low as about 30 parts per 100 parts rubber, but is preferably from about 35 or 45 to about 90 parts by weight.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfurvulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon blacks namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with dithiodipropionic acid as a coupling agent.

The presence and relative amounts of the above additives are not considered to be an aspect of the present invention which is more primarily directed to the utilization of specified blends of rubbers in rubber compositions, in combination with silica and dithiodipropionic acid, or blends of dithiodipropionic acid and bis-(3-triethoxysilylpropyl)tetrasulfide as well as, optionally, carbon black, for the reinforcement of the rubber.

The mixing of the rubber composition can be accomplished by methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more nonproductive mix stages. The terms "non-productive"and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, nicotinamide was evaluated as an alternative for a relatively commonly used silica coupling agent, bis-(3-triethoxysilylpropyl)tetrasulfide, on a carbon black as a carrier, in a silica reinforced rubber composition. The rubber compositions containing the materials set out in Table 1 were prepared in a BR Banbury rubber mixer using three separate, sequential stages of addition (mixing), namely, two non-productive mix stages and one final productive mix to temperatures of 160° C., 160° C. and 120° C. and times of 4 minutes, 4 minutes and 2 minutes, respectively. The amount of coupler is listed as being "variable" in Table 1 and is more specifically set forth in Table 2.

It is clearly evident that utilization of the coupling agent appears to be necessary to obtain suitable cured properties in a silica containing rubber composition, or compound. Such properties include tensile strength at break, the 100 and 300% modulus values, rebound hardness, Rheovibron E' and particularly DIN abrasion resistance (lower indicate less, or values better, abrasion values). Samples 2 and 3, when compared to Sample 1, which was prepared in the absence of utilization of the silica coupling agent, clearly show the advantage of the coupling agents. The properties of Sample 3, which contains the silica coupler utilized in this invention has properties at least equivalent or somewhat better than those exhibited by Sample 2 which contains the conventional silane coupling agent.

In particular, this Example shows that the nicotinamide, as utilized in Sample 3, can provide significant improvements in modulus, rebound, hardness and abrasion when compared to control Sample 1 which does not contain coupling agent. Furthermore, these properties compare favorably to those of Sample 2 which contains the conventional silane coupling agent.

EXAMPLE II

In this example, nicotinamide was evaluated as a partial replacement for the bis-(3-triethoxysilylpropyl)tetrasulfide (an organosilane tetrasulfide) or in combination with dithiodipropionic acid in a rubber composition which contains carbon black and silica particulate reinforcement. The rubber compositions containing the materials set out in Table 3 were prepared in a BR Banbury according to the mixing procedures described in Example I. The variations in the recipes are indicated in Table 4 along with the cure behavior and cured properties.

Again, it is evident that a coupling agent is considered herein in a silica containing rubber compound to achieve optimum cured rubber properties. The combination of nicotinamide with the organosilane tetrasulfide (Sample 5) or dithiodipropionic acid (Sample 6) gave properties somewhat similar to Sample 7 which contained only the organosilane tetrasulfide coupling agent. The overall properties of Samples 5 and 6 are clearly superior to those of Sample 4 which lacks the presence of a coupling agent.

EXAMPLE III

In this example, nicotinamide was evaluated as a coupling agent in a rubber composition which contained a quantitative amount of silica reinforcement and, thus, is considered herein as being highly silica loaded. Rubber compositions containing the materials set out in Table 5 were prepared in a BR Banbury according to the mixing procedures described in Example 1. The cure behavior and cured properties for this composition are indicated in Table 6.

TABLE 1

| 1st Non-Productive | |
|---|---|
| NAT 2200[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxysilylpropyl) tetrasulfide[4] | variable |
| Dithiodipropionic Acid | variable |
| Nicotinamide | variable |
| Productive | |
| Sulfur | 1.40 |
| Accelerator, sulfenamide type | 1.00 |

[1]synthetic cis 1,4-polyisoprene from The Goodyear Tire & Rubber Company;
[2]of the polymerized 1,2-dihydro-2,2,4-trimethylhydroquinoline type;
[3]silica obtained as Hi-Sil-210 from PPG Industries, Inc.;
[4]50% active composite composed of the organosilane tetrasulfide on or with carbon black in a 50/50 weight ratio available as material X50S from Degussa GmbH. Technically the organosilane polysulfide is understood to be a composite, or mixture, in which the average polysulfide bridge contains about 3.5 to 4 connecting sulfur atoms, although the mixture may contain such polysulfides with about 2 to 8 connecting sulfur atoms.

TABLE 2

| Sample # | 1 | 2 | 3 |
|---|---|---|---|
| X50S (Degussa GmbH) | 0 | 3 | 0 |
| Nicotinamide | 0 | 0 | 2 |
| Rheometer (150° C.) | | | |
| Max. Torque | 27.5 | 31.0 | 37.4 |
| Min. Torque | 8.7 | 8.0 | 8.3 |
| Delta Torque | 18.8 | 23.0 | 29.1 |
| $T_{90}$, minutes | 22.5 | 19.5 | 13.8 |
| Stress-Strain | | | |
| Tensile Strength, MPa | 15.8 | 19.1 | 21.3 |
| Elongation at Break, % | 638 | 604 | 616 |
| 100% Modulus, MPa | 1.08 | 1.58 | 1.72 |
| 300% Modulus, MPa | 4.75 | 7.47 | 7.73 |
| Rebound | | | |
| 100° C., % | 55.4 | 61.6 | 59.1 |
| Hardness | | | |
| Shore A, 100° C. | 45.5 | 51.0 | 55.8 |
| Rheovibron | | | |
| E' at 60° C., MPa | 7.94 | 9.11 | 12.72 |
| Tan Delta at 60% | .114 | .104 | .085 |
| DIN Abrasion | 252 | 156 | 137 |

TABLE 3

| 1st Non-Productive | |
|---|---|
| NAT 2200[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxysilylpropyl) tetrasulfide[4] | variable |
| Nicotinamide | variable |
| Dithiodipropionic Acid | variable |
| Productive | |
| Sulfur | 1.40 |
| Accelerator, sulfenamide type | 1.00 |

[1]synthetic cis 1,4-polyisoprene from The Goodyear Tire & Rubber Company;
[2]of the polymerized 1,2-dihydro-2,2,4-trimethylhydroquinoline type;
[3]silica obtained as Hi-Sil-210 from PPG Industries, Inc.;
[4]X50S from Degussa GmbH.

TABLE 4

| Sample # | 4 | 5 | 6 | 7 |
|---|---|---|---|---|
| X50S (Degussa GmbH) | 0 | 2 | 0 | 3 |
| Nicotinamide | 0 | 1 | 1 | 0 |
| Dithiodipropionic Acid | 0 | 0 | 1 | 0 |
| Rheometer (150° C.) | | | | |
| Max. Torque | 26.0 | 37.3 | 36.3 | 33.0 |
| Min. Torque | 4.0 | 4.7 | 6.3 | 5.0 |
| Delta Torque | 22.0 | 32.6 | 30.0 | 28.0 |
| $T_{90}$, minutes | 22.3 | 14.5 | 20.0 | 18.8 |
| Stress-Strain | | | | |
| Tensile Strength, MPa | 14.3 | 21.5 | 21.2 | 19.1 |
| Elongation at Break, % | 632 | 581 | 588 | 624 |
| 100% Modulus, MPa | 1.10 | 2.15 | 2.23 | 1.67 |
| 300% Modulus, MPa | 4.53 | 9.46 | 9.11 | 7.55 |
| Rebound | | | | |
| 100° C., % | 51.7 | 59.0 | 60.5 | 57.9 |
| Hardness | | | | |
| Shore A, 100% | 43.8 | 57.9 | 59.0 | 52.6 |
| Rheovibron | | | | |
| E' at 60° C., MPa | 8.16 | 17.4 | 19.9 | 10.9 |
| Tan Delta at 60° C. | .115 | .086 | .074 | .096 |
| DIN Abrasion | 254 | 120 | 145 | 130 |

TABLE 5

| 1st Non-Productive | |
|---|---|
| SBR 1712[1] | 68.75 |
| BUD 1207[2] | 15.00 |
| NAT 2200[3] | 35.00 |
| Carbon Black | 20.00 |
| Silica[4] | 40.00 |
| Zinc Oxide | 3.00 |
| Fatty Acid | 3.00 |
| Antioxidant[5] | 2.00 |
| Processing Aid[6] | 10.00 |
| Nicotinamide | 3.00 |
| 2nd Non-Productive | |
| Silica[4] | 30.00 |
| Productive | |
| Sulfur | 2.50 |
| Accelerator, sulfenamide type | 3.00 |
| Diphenylguanidine | 2.00 |

[1]23.5% styrene, 37.5 phr aromatic oil from The Goodyear Tire & Rubber Company;
[2]high cis 1,4-polybutadiene from The Goodyear Tire & Rubber Company;
[3]synthetic cis 1,4-polyisoprene from The Goodyear Tire & Rubber Company;
[4]Rhone-Poulenc Zeosil 1165MP;
[5]polymerized 1,2-dihydro-2,2,4-trimethylquinoline type;
[6]Struktol A6.

TABLE 6

| Sample # | 8 |
|---|---|
| Rheometer, 150° C. | |
| Max. Torque | 50.5 |
| Min. Torque | 10.0 |
| Delta Torque | 40.5 |
| $T_{90}$, minutes | 11.8 |
| Stress-Strain | |
| Tensile Strength, MPa | 9.50 |
| Elongation at Break, % | 326 |
| 100% Modulus, MPa | 3.35 |
| Rebound | |
| 100° C., % | 53.0 |
| Hardness | |
| Shore A, 100° C. | 65.6 |
| DIN Abrasion | 168 |

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of (A) 100 parts by weight of at least one diene-based elastomer, (B) about 25 to about 100 phr of filler composed of particulate, precipitated silica and carbon black, and (C) a silica coupler selected from (i) nicotinamide or from (ii) a combination of about 95 to about 25 weight percent nicotinamide and, correspondingly, about 5 to about 75 weight percent of at least one of (a) bis-(3-trialkoxysilylalkyl)polysulfide containing from 2 to 8 sulfur atoms in its polysulfide bridge, and (b) dithiodipropionic acid; wherein the weight ratio of said silica coupler to silica is in a range of about 0.01/1 to about 0.2/1; wherein the weight ratio of silica to carbon black, is at least about 0.1/1.

2. The rubber composition of claim 1 wherein the said silica coupler consists essentially of nicotinamide.

3. The rubber composition of claim 1 wherein the said silica coupler is a combination of about 95 to about 25 weight percent nicotinamide and, correspondingly, about 5 to about 75 weight percent of at least one of bis-(3-triethoxysilylpropyl)tetrasulfide and bis-(3-triethoxysilylpropyl)trisulfide.

4. The rubber composition of claim 1 wherein the said silica coupler is a combination of about 95 to about 25 weight percent nicotinamide and, correspondingly, about 5 to about 75 weight percent dithiodipropionic acid.

5. The rubber composition of claim 4 where said dithiodipropionic acid is 3,3'-dithiodipropionic acid.

6. The rubber composition of claim 1 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber and emulsion polymerization prepared styrene/butadiene/acrylonitrile terpolymer rubber and butadiene/acrylonitrile copolymer rubber.

7. The rubber composition of claim 1 wherein the silica is characterized by having a BET surface area in a range of about 50 to about 300 square meters per gram and a dibutylphthalate (DBP) absorption value in a range of about 150 to about 300.

8. The rubber composition of claim 2 wherein the silica is characterized by having a BET surface area in a range of about 50 to about 300 square meters per gram and a dibutylphthalate (DBP) absorption value in a range of about 150 to about 300.

9. The rubber composition of claim 3 wherein the silica is characterized by having a BET surface area in a range of about 50 to about 300 square meters per gram and a dibutylphthalate (DBP) absorption value in a range of about 150 to about 300.

10. A rubber composition comprised of (A) 100 parts by weight of at least one diene-based elastomer, (B) about 25 to about 90 phr particulate silica, (C) up to about 30 phr carbon black, and (D) a silica coupler which is collectively composed of about 90 to about 55 weight percent nicotinamide, about 5 to about 25 weight percent of at least one of bis-(3-triethoxysilylpropyl)tetrasulfide and bis-(3-triethoxysilylpropyl)trisulfide and about 5 to about 25 weight percent dithiodipropionic acid; wherein the weight ratio of said silica coupler to silica is in a range of about 0.01/1 to about 0.2/1; wherein the weight ratio of silica to carbon black is in a range of about 3/1 to about 30/1; wherein the silica is characterized by having a BET surface area in a range of about 50 to about 300 square meters per gram and a dibutylphthalate (DBP) absorption value in a range of about 150 to about 300.

11. A tire having a rubber tread wherein said tread is comprised of the rubber composition of claim 1.

12. A tire having a rubber tread wherein said tread is comprised of the rubber composition of claim 2.

13. A tire having a rubber tread wherein said tread is comprised of the rubber composition of claim 3.

14. A tire having a rubber tread wherein said tread is comprised of the rubber composition of claim 4.

15. A tire having a rubber tread wherein said tread is comprised of the rubber composition of claim 5.

16. A tire having a rubber tread wherein said tread is comprised of the rubber composition of claim 6.

17. A tire having a rubber tread wherein said tread is comprised of the rubber composition of claim 7.

18. A tire having a rubber tread wherein said tread is comprised of the rubber composition of claim 8.

19. A tire having a rubber tread wherein said tread is comprised of the rubber composition of claim 9.

20. A tire having a rubber tread wherein said tread is comprised of the rubber composition of claim 10.

* * * * *